United States Patent
Balasubramanian

(10) Patent No.: US 8,681,711 B2
(45) Date of Patent: Mar. 25, 2014

(54) INACTIVITY-BASED MULTI-CARRIER ALLOCATION IN WIRELESS NETWORKS

(75) Inventor: Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 909 days.

(21) Appl. No.: 12/244,147

(22) Filed: Oct. 2, 2008

(65) Prior Publication Data
US 2009/0092091 A1 Apr. 9, 2009

Related U.S. Application Data

(60) Provisional application No. 60/978,017, filed on Oct. 5, 2007.

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| | | | |
|---|---|---|---|
| 7,260,079 B1 * | 8/2007 | Chapman et al. | 370/338 |
| 2002/0160812 A1 * | 10/2002 | Moshiri-Tafreshi et al. | 455/561 |
| 2002/0172178 A1 * | 11/2002 | Suzuki et al. | 370/338 |
| 2005/0192046 A1 * | 9/2005 | Harris | 455/552.1 |
| 2006/0281465 A1 | 12/2006 | McBeath et al. | |
| 2007/0058592 A1 * | 3/2007 | Kim et al. | 370/335 |

FOREIGN PATENT DOCUMENTS

| | | |
|---|---|---|
| EP | 0786890 A2 | 7/1997 |
| EP | 0869647 A2 | 10/1998 |
| WO | 2007038729 | 4/2007 |

OTHER PUBLICATIONS

International Search Report and Written Opinion—PCT/US2008/078827—ISA/EPO—Mar. 20, 2009.
Taiwan Search Report—TW097138347—TIPO—Feb. 20, 2012.

* cited by examiner

*Primary Examiner* — Yong Zhou
(74) *Attorney, Agent, or Firm* — Kevin T. Cheatham

(57) ABSTRACT

Systems and methodologies are described that facilitate adjusting allocation of carriers based on inactivity in wireless communications. An inactivity and dormancy timer are provided to allow carrier deallocation in periods of communicative inactivity (after expiration of the inactivity timer) without terminating the connection until expiration of the dormancy timer. Upon expiration of the inactivity timer, carriers can be deallocated from communication to conserve resources and reduce interference while still allowing requests to be made over the connection. If such requests are made, carriers can be reallocated to efficiently transmit a response. The timers are reset when communications are active. In addition, the timers can have expiration times related to aspects of connection, such as a protocol utilized thereover, connection quality, and/or or the like.

30 Claims, 11 Drawing Sheets

INACTIVITY-BASED MULTI-CARRIER ALLOCATION IN WIRELESS NETWORKS

CROSS-REFERENCE TO RELATED APPLICATIONS

This application claims priority to Provisional Patent Application No. 60/978,017 entitled "INACTIVITY-BASED MULTI-CARRIER ALLOCATION METHOD AND APPARATUS" filed Oct. 5, 2007, and assigned to the assignee hereof and hereby expressly incorporated by reference herein.

BACKGROUND

I. Field

The following description relates generally to wireless communications, and more particularly to adjusting multi-carrier allocation based on inactivity in wireless communication networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In multi-carrier systems, a plurality of carriers can be allocated for communication over one or more of the multiple antennas to facilitate simultaneous communication thereover, which inherently increases communication throughput between devices utilizing the multiple carriers. The base station can allocate the plurality of carriers to the mobile device upon establishment of communication.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating adjusting allocation of multiple carriers in wireless communications based at least in part on activity or inactivity levels. According to an example, an access point can allocate a number of carriers for use by a mobile device in communicating with the access point. Depending on a protocol utilized for communication and/or one or more predicted or determined behaviors of the communication, the access point can accordingly adjust carrier allocation to allow not only for conservation of power on a respective device, but also reallocation of the carriers to other devices utilizing the access point, for example. In one example, the access point can utilize multiple timers to adjust the allocation of carriers. For instance, an inactivity timer can be utilized to reduce the number of carriers allocated to a device following a period of inactivity as well as a dormancy timer to terminate the connection with the device following a period of dormancy. If activity occurs after the number of carriers have been reduced but before connection termination, additional carriers can be allocated to the device and the timers reset. It is to be appreciated that the timers can be in the mobile device in addition or alternatively to the access point.

According to related aspects, a method for allocating multi-carrier resources in wireless communication networks is provided. The method includes allocating multiple carriers to a connection with a mobile device facilitating communication therewith. The method further includes reducing the connection with the mobile device to a single allocated carrier based at least in part on an inactivity timer.

Another aspect relates to a wireless communications apparatus. The wireless communications apparatus can include at least one processor configured to allocate a plurality of carriers to a connection with a mobile device to facilitate communication therewith and determine expiration of an inactivity timer related to the connection. The processor is further configured to reduce the connection to a single allocated carrier based at least in part on expiration of the inactivity timer. The wireless communications apparatus further comprises a memory coupled to the at least one processor.

Yet another aspect relates to a wireless communications apparatus that facilitates adjusting a number of carriers utilized in wireless communications. The wireless communications apparatus can comprise means for allocating a plurality of carriers to a connection with a mobile device to facilitate communication therewith. The wireless communications apparatus can additionally include means for deallocating a portion of the plurality of carriers to a minimum number of carriers based at least in part on expiration of an inactivity timer.

Still another aspect relates to a computer program product, which can have a computer-readable medium including code for causing at least one computer to allocate multiple carriers to a connection with a mobile device facilitating communication therewith. The computer-readable medium can also comprise code for causing the at least one computer to reduce the connection with the mobile device to a single allocated carrier based at least in part on an inactivity timer.

Another aspect relates to an apparatus. The apparatus comprises a carrier allocator that allocates a plurality of carriers for a connection established with a mobile device and a transceiver that facilitates communicating with a mobile device over the plurality of allocated frequency carriers. The apparatus further comprises a carrier deallocator that deallocates one or more of the assigned frequency carriers from the connection based at least in part on expiration of an inactivity timer.

According to a further aspect, a method for allocating multi-carrier resources in wireless communication networks is provided. The method includes receiving multiple allocated carriers upon establishing a connection with an access point facilitating communication therewith. The method further includes dropping one or more of the multiple allocated carriers leaving a minimum number of carriers based at least in part on expiration of an inactivity timer.

Another aspect relates to a wireless communications apparatus. The wireless communications apparatus can include at least one processor configured to receive a plurality of allocated carriers for connection with an access point to facilitate communication therewith and determine expiration of an inactivity timer related to the connection. The processor is further configured to drop one or more of the plurality of allocated carriers leaving a single allocated carrier based at least in part on expiration of the inactivity timer. The wireless communications apparatus further comprises a memory coupled to the at least one processor.

Yet another aspect relates to a wireless communications apparatus that facilitates adjusting a number of carriers utilized in wireless communications. The wireless communications apparatus can comprise means for receiving a plurality of allocated carriers for connection with an access point to facilitate communication therewith. The wireless communications apparatus can additionally include means for deallocating a portion of the plurality of carriers to a minimum number of carriers based at least in part on expiration of an inactivity timer.

Still another aspect relates to a computer program product, which can have a computer-readable medium including code for causing at least one computer to receive multiple allocated carriers upon establishing a connection with an access point facilitating communication therewith. The computer-readable medium can also comprise code for causing the at least one computer to drop one or more of the multiple allocated carriers leaving a minimum number of carriers based at least in part on expiration of an inactivity timer.

Another aspect relates to an apparatus. The apparatus comprises a carrier requestor that receives a plurality of requested carriers for connection to an access point and an inactivity timer utilized to detect a period of communicative inactivity. The apparatus further comprises a carrier dropper that drops one or more of the assigned frequency carriers leaving a minimum number of carriers for requesting data based at least in part on expiration of an inactivity timer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
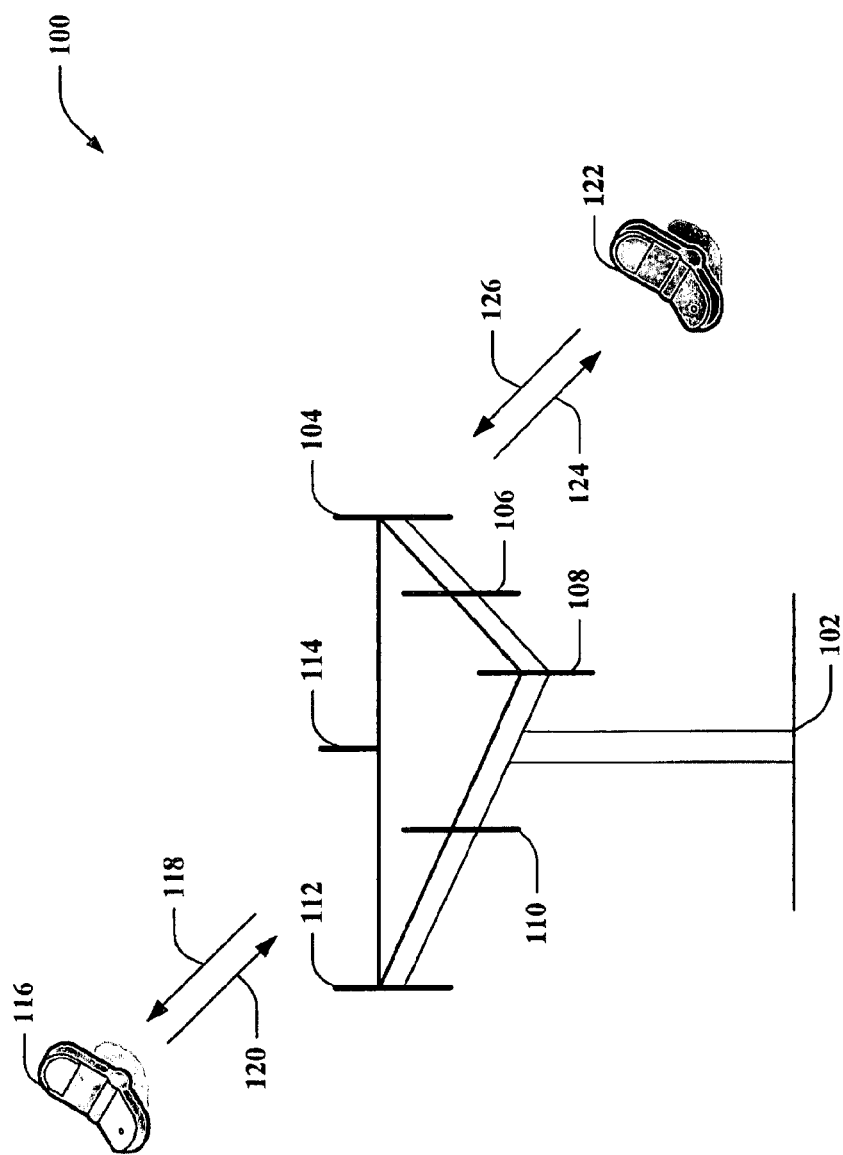
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1xEV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. In one example, the base station 102 and/or mobile devices 116/122 can receive information from each other and/or additional mobile devices/base stations by employing a wideband multicarrier transceiver (e.g., rake receiver), which can be integrated or otherwise. For example, the wideband multicarrier transceiver (not shown) can comprise multiple receivers that simultaneously receive signals from disparate frequencies over a plurality of carriers. Carriers, in this context, can refer to frequency carriers, or other types of bandwidth portions, such as OFDM tones, or other minimum allocable units such as a number of slots over a number of subcarriers schedulable in a subframe, and/or the like. Thus, increased throughput is achieved by the base station 102 and/or mobile devices 116/122, as it can receive and demodulate multiple signals over a given time period. Moreover, the base station 102 can dynamically allocate carriers for receiving data based at least in part on determinations made at the base station 102 and/or mobile devices 116/122, as described herein.

According to an example, a mobile device 116 and/or 122 can establish communications with the base station 102 receiving a number of allocable carriers for the mobile device 116 and/or 122. In one example, upon connection establishment and carrier allocation, the base station 102 can start an inactivity and dormancy timer to allow indication of when to reduce carrier allocation and/or terminate the connection based on expiration of the respective timers. For example, once started, if the inactivity timer expires due to inactivity over the reverse link 120 and/or 126 and/or forward link 118 and/or 124 (e.g., not receiving requests or other data), the base station 102 can deallocate a number of carriers from the mobile device 116 and/or 122 to preserve power consumption and resources, reduce interference, as well as to allocate the carriers to disparate devices if desired. However, at least one or a minimum number of carriers continue to be allocated to the mobile device 116 and/or 122 to facilitate receiving subsequent data over the reverse link 120 and/or 126, such as a request to receive data. If such a request or other data is received over the reverse link 120 and/or 126 and/or forward link 118 and/or 124, the inactivity timer and dormancy timer for the respective mobile device 116 and/or 122 can be reset.

If, however, a request or other data is not received over the reverse link 120 and/or 126 or forward link 118 and/or 124 before the dormancy timer expires, the connection can be terminated. In an example, this can include deallocating remaining carriers resulting from expiration of the inactivity timer. If the mobile device 116 and/or 122 requests additional data following connection termination, it must reestablish connection, which can require more resources than keeping a minimum number of carriers allocated after expiration of the inactivity timer. Thus, more efficient utilization of carriers is provided by allowing a minimum number of carriers to be allocated to mobile devices 116/122 in periods of inactivity but not dormancy, while increasing the number upon receiving a request or other data over a reverse link 120 and/or 126. In addition, such carrier adjustment decreases interference caused by the multiple carriers, which can affect communications with other devices. It is to be appreciated that the timers can be implemented in the base station 102 and/or in mobile devices 116/122, as described herein. Moreover, the existence and/or initial parameters for the timer can be based at least in part on a request from the mobile devices 116/122, a protocol thereof, and/or a number of considerations in both the mobile device 116/122 and/or base station 102, such as available resources, activity level, number of requests, and/or the like, as described herein.

Figure 2:
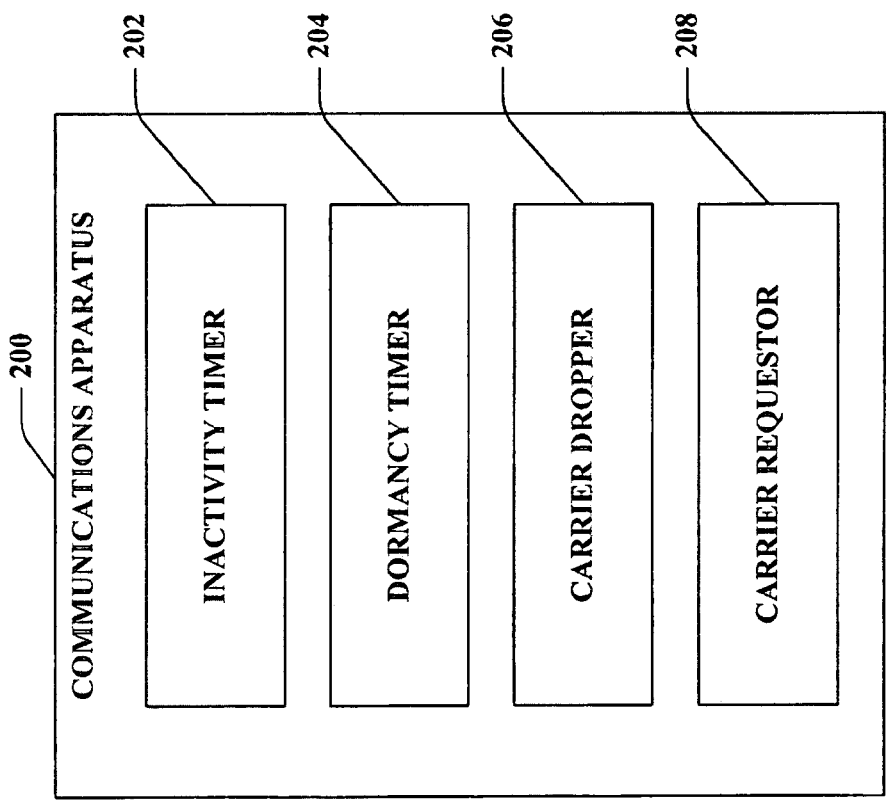
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include an inactivity timer 202 that runs during periods of communicative inactivity in the communications apparatus 200, a dormancy timer 204 that also runs during periods of communicative inactivity in the communications apparatus 200 but is set for a longer time period than the inactivity timer to indicate communicative dormancy, a carrier dropper 206 that can drop one or more carriers based at least in part on expiration of the inactivity timer 202 and/or dormancy timer 204, and a carrier requester 208 that can request one or more carriers based at least in part on communicative activity in the communications apparatus 200. Communicative inactivity and dormancy can relate to ceasing outward communication from the communications apparatus 200 for a period of time. Similarly, communicative activity can relate to continuous periods of transmitting requests and/or receiving data by the communications apparatus 200.

According to an example, the communications apparatus 200 can establish communication with one or more wireless devices, such as an access point or base station (not shown), for example. The communications apparatus 200 can be allocated a number of carriers upon establishing communications and can communicate over the carriers. Upon ceasing communication, on a forward or reverse link for example, the inactivity timer 202 and the dormancy timer 204 can begin. The inactivity timer 202 can be set for a period of time after which inactivity is presumed. Similarly, the dormancy timer 204 can be set for a period of time after which dormancy is presumed and connection with the communications apparatus 200 should be terminated. As mentioned, upon communicative activity resuming over a reverse link or forward link to the communications apparatus 200, the timers 202 and 204 can be reset. The timers 202 and 204 can be continually reset in periods of activity and begin to run when activity is no longer occurring.

In one example, as described, the communications apparatus 200 can receive a plurality of carrier allocations for subsequent communication. Upon expiration of the inactivity timer 202 due to communicative inactivity as described, the carrier dropper 206 can drop one or more of the allocated carriers to reach a minimum number of carriers. The minimum number of carriers is that number required to effectively communicate over a specified protocol. For example, using a hypertext transfer protocol (HTTP), requests for a web page or other data are typically smaller in size than the response (e.g., the web page or other content). Thus, a single carrier can likely handle the request, and so the carrier dropper 206 can drop all but a single carrier to keep an open line of communication with the access point. If a request is so generated and/or transmitted before expiration of the dormancy timer 204, the carrier requester 208 can request additional carriers to handle the response message. The number of additional carriers can be similarly based on that required to effectively communicate over the specified protocol, such as for HTTP in the example above. In addition, the inactivity timer 202 and dormancy timer 204 can be reset upon receiving the request.

If, however, the dormancy timer 204 expires before activity, the carrier dropper 206 can drop the remaining minimum number of carriers and terminate the connection. In this regard, the communications apparatus 200 can conserve resources by releasing carriers when not needed as opposed to always terminating the connection, which can require resources to reestablish. Having the inactivity timer 202 and the dormancy timer 204 achieve this end, as shown above. It is to be appreciated that other timers can be implemented as well to provide more levels of carrier adjustment, such as a timer for each carrier allocated that progressively deallocate the carriers in periods of inactivity, for example. In addition, the timer durations can be set based at least in part on the communication protocol, available resources, activity level, number of requests, etc. For example, if the communications apparatus 200 has multiple requests queued and/or high activity level, the carrier requestor 208 can request more additional carriers than for a single request. Also, the number of carriers requested by the carrier requester 208 can be conditioned on available resources in the communications apparatus 200 to utilize the additional carriers.

Figure 3:
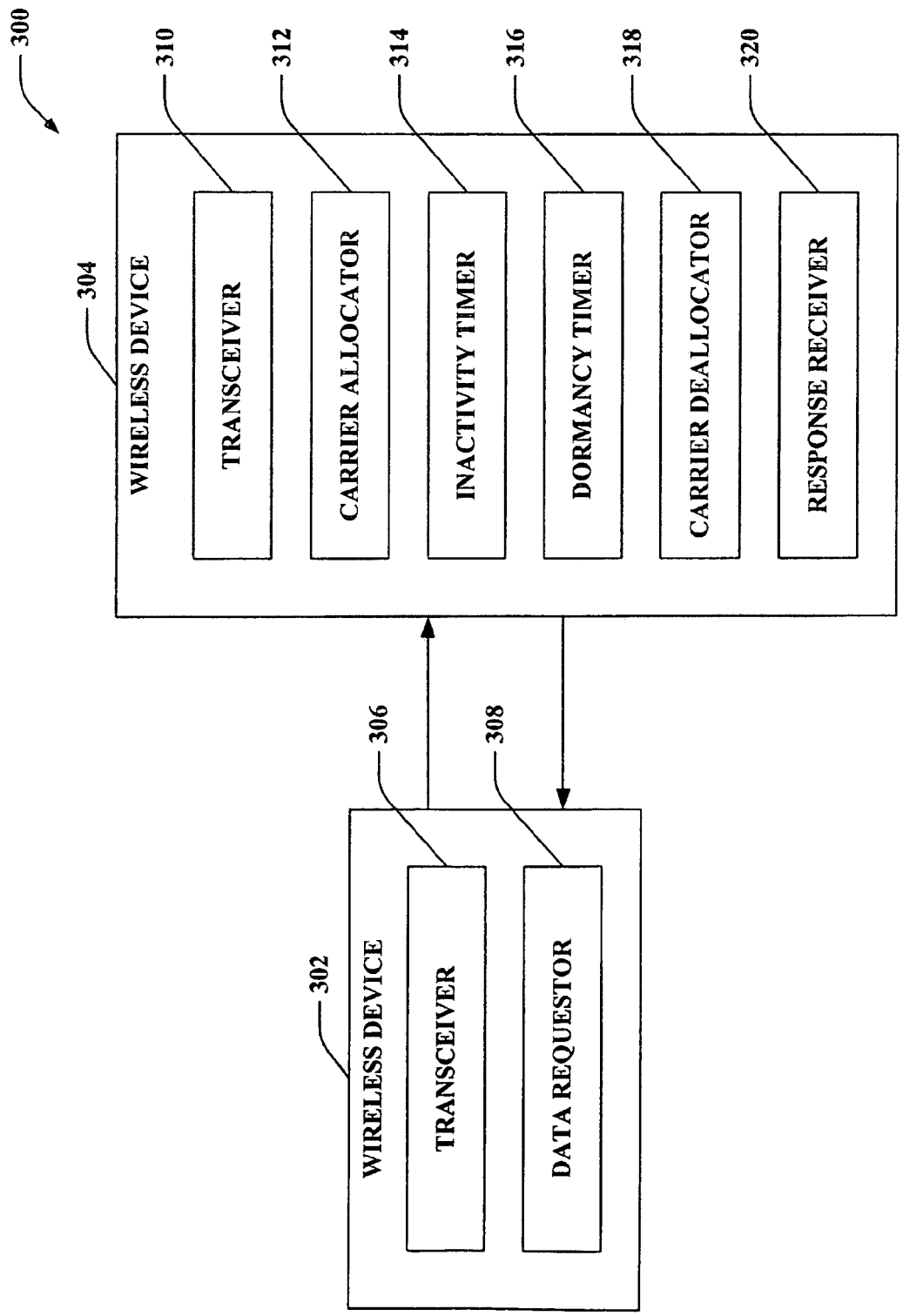
FIG. 3 is an illustration of an example wireless communications system that effectuates adjusting carrier allocation based on communicative inactivity.

Now referring to FIG. 3, illustrated is a wireless communications system 300 that facilitates allocating multi-carrier resources in wireless communication networks. Each wireless device 302 and 304 can be a base station, mobile device (including not only independently powered devices, but also modems, for example), or portion thereof. In one example, wireless device 302 can transmit information to wireless device 304 over a reverse link or uplink channel; further wireless device 302 can receive information from wireless device 304 over a forward link or downlink channel, or vice versa. Moreover, system 300 can be a MIMO system (e.g., evolution data optimized (EV-DO), etc.), and the wireless devices 302 and 304 can simultaneously communicate with each other over multiple carriers. Also, the components and functionalities shown and described below in the wireless device 302 can be present in the wireless device 304 as well and vice versa, in one example; the configuration depicted excludes these components for ease of explanation.

Wireless device 302 includes a transceiver 306 for communicating with wireless device 304 and/or one or more access points in a wireless network over one or more frequency carriers and a data requester 308 that formulates requests for data, which can be transmitted to wireless device 304 using the transceiver 306. In one example, the request for data can comprise an HTTP, file transfer protocol (FTP) request, and/or substantially any type of request where low bandwidth is required for making the request as compared to high bandwidth that can be utilized to effectively receive a response to the request.

Wireless device 304 includes a transceiver 310 for communicating with wireless device 302, a carrier allocator 312 that can allocate carriers to the wireless device 302 to facilitate wireless communication, an inactivity timer 314 and a dormant timer 316 that can be set to respectively determine a period of communicative inactivity and a communicative dormancy period, as described, for the wireless device 302, a carrier deallocator 318 that can deallocate one or more carriers from the wireless device 302 communication, and a response receiver 320 that can acquire data related to a request made by the wireless device 302 via data requestor 308. In one example, the request can relate to receiving HTTP or FTP data. Upon receiving the request, the wireless device 304 can perform additional processing, such as request forwarding and/or locating requested data, and the response receiver 320 can open a connection with another network or device (not shown) to receive the response.

According to an example, the wireless device 302 can establish communication with the wireless device 304 using transceiver 306. Upon connection establishment, the carrier allocator 312 can allocate one or more carriers to the wireless device 302 connection. Using the one or more carriers, the data requester 308 can request data from the wireless device 304 and can receive the data over the one or more or additional carriers as described herein. For example, where the wireless device 302 is communicating with wireless device 304 using less than a threshold number of carriers for a request made, the carrier allocator 312 can allocate additional carriers to the wireless device 302 to handle the response to the request upon receiving the request. For example, in a request for HTTP and/or FTP data, the initial request can be small in size compared to a response to the data (e.g., the request can be a simple universal resource locator (URL) while the response is an entire webpage or file). Thus, upon the wireless device 304 receiving the request, if it determines that a threshold number of carriers are not allocated to the wireless device 302 to effectively handle the response, the carrier allocator 312 can allocate the appropriate amount of carriers before the response receiver 320 receives the response. Once the response receiver 320 receives the response, it can be forwarded to the wireless device 302 over the allocated carriers using transceiver 310, for example.

In an example, the number of carriers required to receive the response need not always be allocated to the wireless device 302, especially where the device is communicatively inactive for a period of time. However, terminating connection between the wireless devices 302 and 304 is not always desirable even where the wireless device 302 is communicatively inactive for a period of time. Thus, the inactivity timer 314 and the dormancy timer 316 respectfully allow the foregoing ends to be achieved. In this regard, the inactivity timer 314 can determine when the wireless device 302 is not communicatively active with wireless device 304, and the dormancy timer 316 can determine a longer period of communicative inactivity, which becomes dormancy, such that the connection between the wireless devices 302 and 304 should be terminated. It is to be appreciated that the inactivity timer 314 and dormancy timer 316 can be set by a hardcoded value, network specification, and/or the like. In addition, the value can be based on a type of request or protocol utilized to communicate. For example, HTTP and FTP requests can have different values for setting the inactivity timer 314 and/or dormancy timer 316. Moreover, HTTP requests for streaming or dynamic data can result in different values being set for the inactivity 314 and/or dormancy timers 316, for example. In addition, a type of application utilized to communicate can be utilized to set values for the inactivity and/or dormancy timers 314 and 316. In another example, available resources in the wireless device 304 can be considered in allocating additional carriers. Also, a number of requests can be considered such that if the wireless device 302 transmits more than one request, more carriers can be allocated for transmitting multiple responses, for example.

In the foregoing example, the inactivity timer 314 can begin when data is no longer being transmitted or received over the multiple carriers of the connection between wireless devices 302 and 304, where there is communicative inactivity, as described. This can be detected by transceiver 310 in one example. If data transmission continues before expiration of the inactivity timer 314, when communicative activity continues, the timer can reset. Again, this can be determined at the transceiver 310 by monitoring the carriers. If, however, the inactivity timer 314 expires due to communicative inactivity over the carriers, the carrier deallocator 318 can deallocate a number of carriers from the connection to reach a minimum number of carriers for receiving a subsequent data request. In one example, the minimum can be a single carrier to allow data requesting. Reducing to the minimum number of carriers can additionally decrease interference for the remaining carrier(s) over the reverse link. In one example, this can be because a pilot and control channel (such as a data rate control (DRC) channel in an EV-DO context) are not constantly present and/or transmitting for remaining carriers.

Thus, if a request formulated by the data requester 308 is transmitted over the transceiver 306 and received at the transceiver 310 before expiration of the dormancy timer 316, the carrier allocator 312 can reallocate a threshold number of carriers, as described, to facilitate efficient receipt and interpretation of resulting data. In one example, the reallocation can occur before response receiver 320 receives the resulting data. Similarly to the inactivity timer 314, the dormancy timer 316 can be reset at each communication over allocated carriers. However, the dormancy timer 316 can be set at a time later than the inactivity timer 314 to indicate when the wireless connection should be terminated. Thus, after the inactivity timer 314 expires and the connection is brought down to a minimum number carriers by carrier deallocator 318, if a request from the data requestor 308 is not received over transceiver 319 before the dormancy timer 316 expires, the connection can be terminated completely.

In this regard, the two levels of timer allow for a decrease in communication resources after a given period of time and a total termination after a longer period. This is beneficial, for example, in request/response type environments as the inactivity timer can allow resources to be throttled when not needed (e.g., to make a request over HTTP, typically a minimal amount of resources are needed), but not completely terminated. In request/response environments, after a response is received, typically the next data transmitted will be another request. Since requests can require a small amount of resources as compared to the response, the timers work in conjunction to reduce carriers in handling a subsequent request without terminating the connection. It is to be appreciated that after termination of the connection, the wireless device 302 would need to reestablish the connection and carriers to transmit data, which can come with more overhead and latency as compared to keeping a minimum number of carriers open for a dormancy time period.

Figure 4:
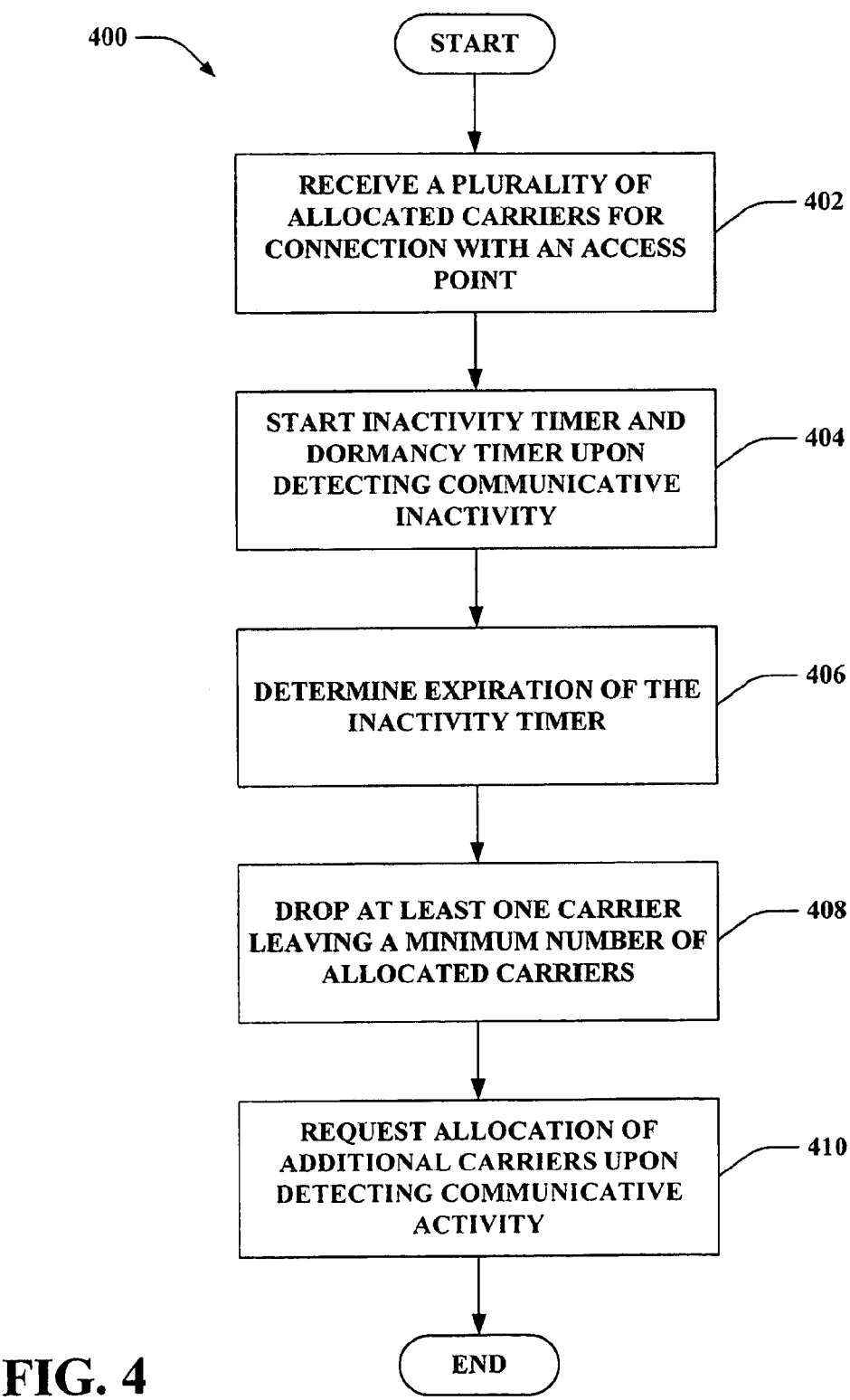
FIG. 4 is an illustration of an example methodology that facilitates requesting and dropping carriers based on communicative inactivity and activity.
Figure 5:
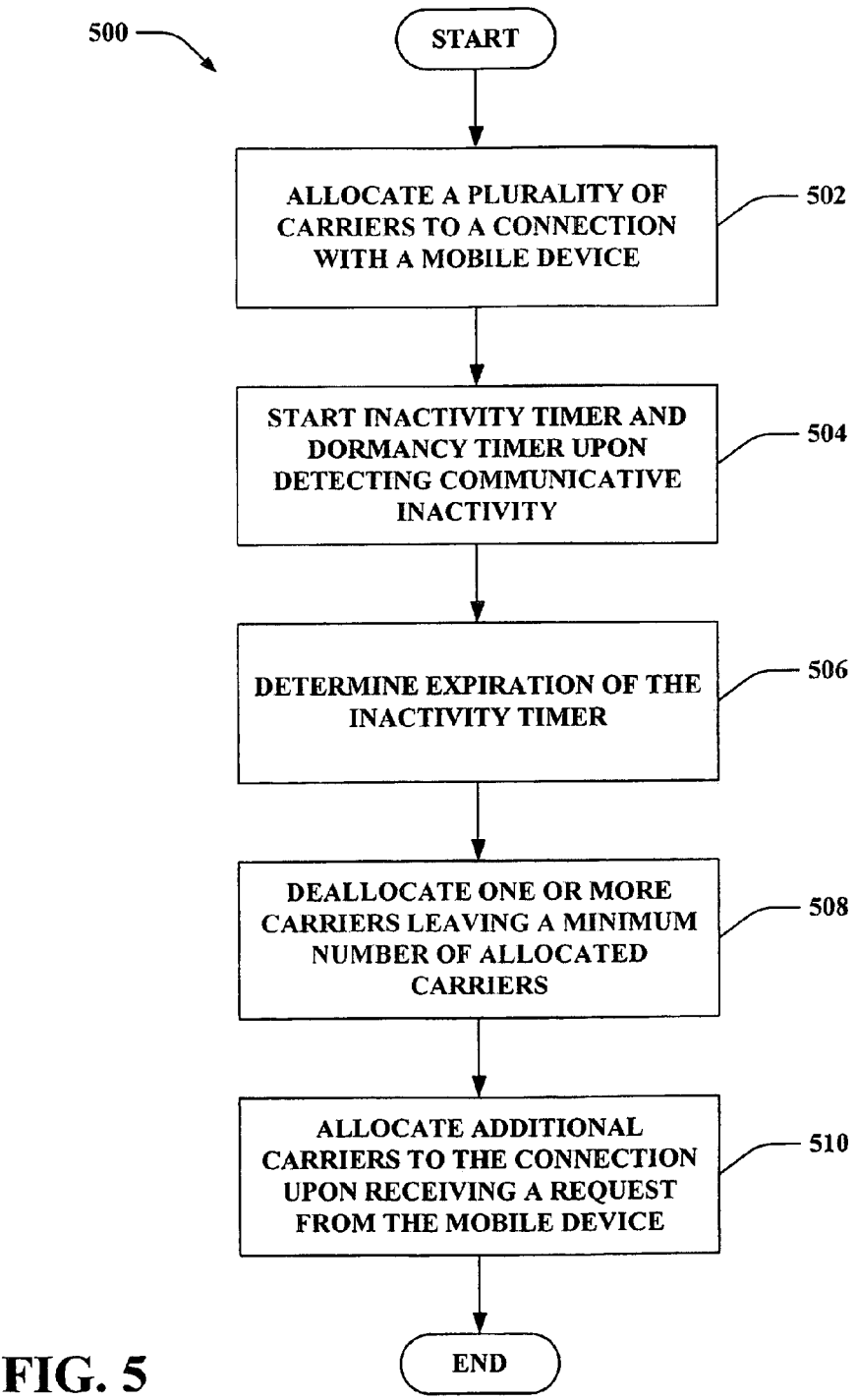
FIG. 5 is an illustration of an example methodology that facilitates adjusting carrier allocation based on communicative inactivity and activity.
Figure 6:
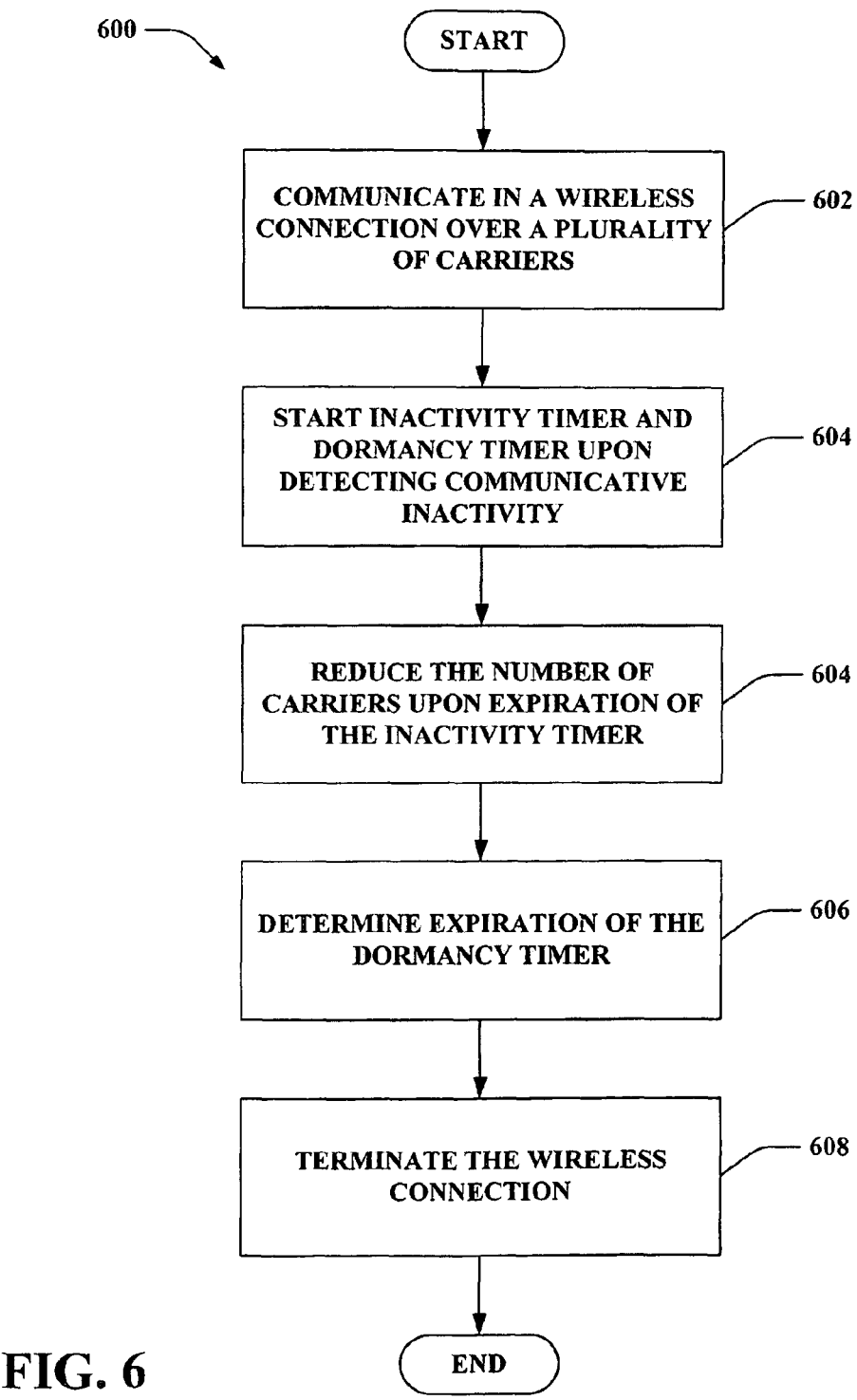
FIG. 6 is an illustration of an example methodology that facilitates terminating a connection based on communicative dormancy.

Referring to FIGS. 4-6, methodologies relating to adjusting allocation of carriers related to timers for inactivity are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, a methodology 400 that facilitates adjusting allocation of carriers according to periods of inactivity in wireless communications is displayed. At 402, a plurality of allocated carriers are received for connection with an access point. The carriers can be utilized to simultaneously communicate with the access point. At 404, inactivity and dormancy timers can be started upon detecting communicative inactivity over the carriers. As described, this can be detected when data is not transmitted or received over a transceiver, for example. At 406, expiration of an inactivity timer can be determined. The timer can reset upon communicative activity as described, for example, but can start again when communicative activity is not present over the carriers. At 408, one or more carriers can be dropped leaving a minimum number of allocated carriers. As described above, notification of the drop can also be transmitted to the access point. Dropping the carriers when not needed for communication can preserve resources and minimize interference typically generated by the carriers. At 410, additional carriers can be requested upon detecting communicative activity. As described, the communicative activity can be detected based at least in part on receiving or transmitting data over the allocated carriers.

Turning to FIG. 5, a methodology 500 that facilitates adjusting allocation of carriers according to periods of inactivity in wireless communications is displayed. At 502, a plurality of carriers are allocated to a connection with a mobile device. The carriers can be utilized to simultaneously communicate with the mobile device. At 504, inactivity and dormancy timers can be started upon detecting communicative inactivity. As described, this can be detected when data is not transmitted or received over a transceiver. At 506, expiration of an inactivity timer can be determined. The timer can reset upon communicative activity as described, for example, but can start again when communicative activity is not present over the carriers. At 508, one or more carriers can be deallocated leaving a minimum number of allocated carriers. As described above, this can be a more efficient initial alternative to terminating the connection while still saving resources and minimizing interference. One reason this is more efficient is that it allows for a longer period of dormancy where the mobile device can still make a request without having to reestablish connection, but not all resources need be allocated during the inactivity time. At 510, additional carriers can be allocated to the connection upon receiving a request from the mobile device. As described, once a request for data is received during the period of communicative inactivity, a plurality of carriers can be reallocated to the mobile device to handle a response to the request. In an HTTP context, the request can transmitted effectively over a low number of carriers since it can be less resource intensive than a response thereto.

Turning to FIG. 6, illustrated is a methodology 600 that facilitates utilizing at least two timers to adjust carrier allocation during periods of inactivity in wireless communications. At 602, communication can occur in a wireless connection over a plurality of carriers. As described, the multiple carriers can facilitate simultaneous transfer of data resulting in higher throughput. At 604, inactivity and dormancy timers can be started upon detecting communicative inactivity. As described, this can be detected when data is not transmitted or received over a transceiver. At 606, the number of carriers can be reduced upon expiration of an inactivity timer, as described above. This can relate to dropping carriers and/or deallocating carriers depending on an implementation of the method. Thus, if additional data were transmitted or received in the meantime, the inactivity timer and dormancy timers could be reset and resources allocated to handle the response, etc., as described above. In this case, however, at 608 expiration of the dormancy timer can be determined. The dormancy timer can be set at a greater time period than the inactivity timer and can indicate termination of the connection for the longer period of inactivity. Thus, at 610, the wireless connection is terminated. In this regard, a connection must be reestablished to facilitate further communication.

It will be appreciated that, in accordance with one or more aspects described herein, inferences can be made regarding determining timer values, request types that relate to the timer values, events to reset the timers, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
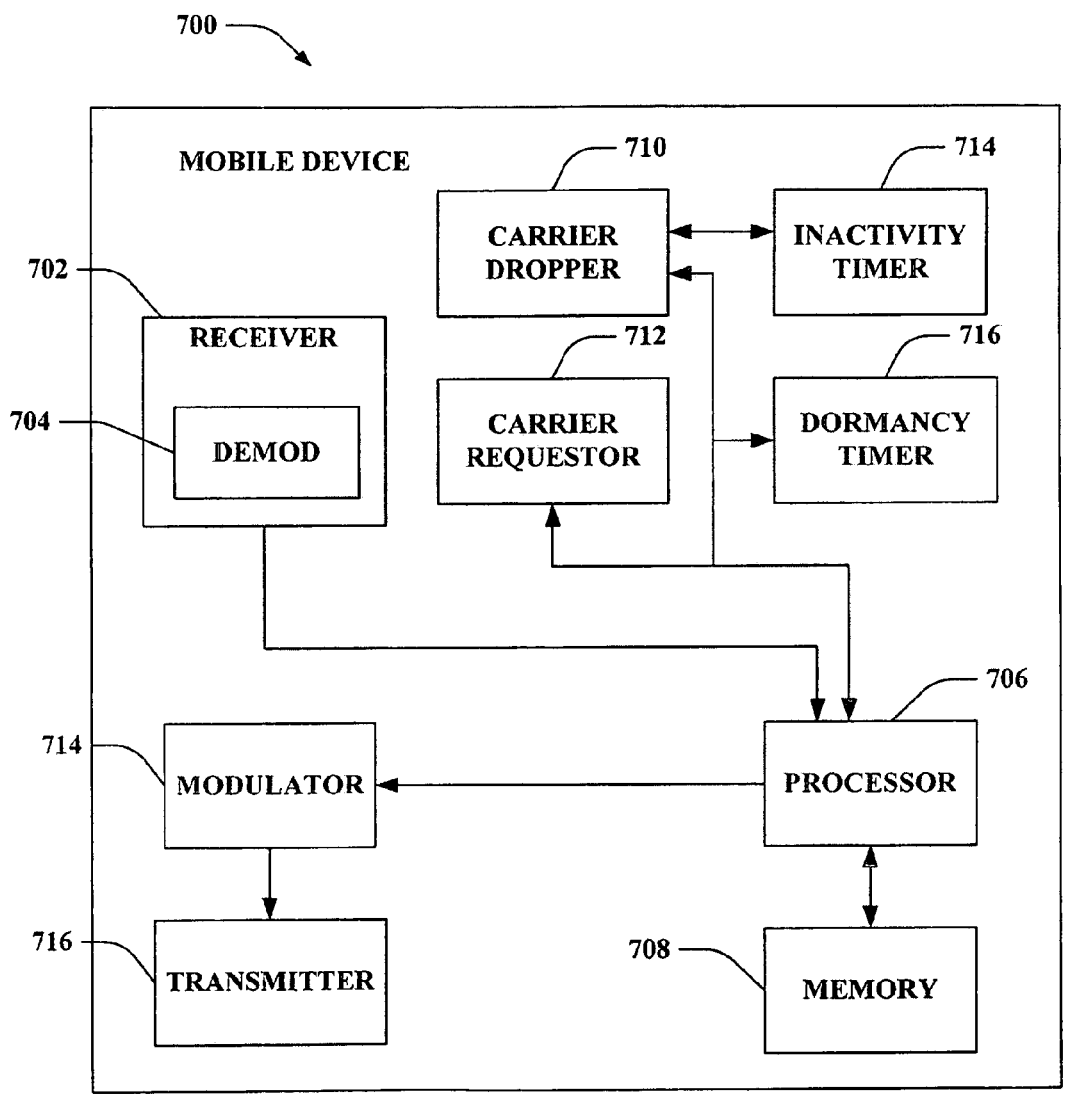
FIG. 7 is an illustration of an example mobile device that facilitates dropping and requesting carriers based on communicative inactivity.

FIG. 7 is an illustration of a mobile device 700 that facilitates adjusting carrier allocation based on inactivity in wireless communication networks. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

In an example, as described, the mobile device 700 can be initially allocated a plurality of carriers in communicating with a base station or other wireless service access device. Processor 706 can further be operatively coupled to a carrier dropper 710 that can drop one or more of the allocated carriers and a carrier requester 712 that can be utilized to request an additional carrier from the wireless access service device, for example. The processor 706, or carrier dropper 710, is further operatively coupled to an inactivity timer 714 and a dormancy timer 716 that can be started upon detecting a period of communicative inactivity. Expiration of the inactivity timer 714 can cause the carrier dropper 710 to drop one or more carriers leaving a minimum number for initial communication following the inactivity. Similarly, expiration of the dormancy timer 716 can cause the connection with the wireless service access device to be terminated.

If the communicative activity continues following dropping of carriers but before the dormancy timer 716 expires, the carrier requester 712 can request one or more additional carriers to efficiently receive a response to the request. In one example, the carrier requester 712 can receive the carriers for subsequent utilization in communications. In this regard, as described, allowing a period of inactivity before connection termination conserves resources in not requiring reestablishment of connection during the inactivity. In addition, by allowing carrier drop to a minimum number of carriers, resources are conserved for the inactivity period as opposed to leaving all carriers open—interference is also reduced in this regard. Mobile device 700 still further comprises a modulator 714 and transmitter 716 that respectively modulate and transmit signals to, for instance, a base station, another mobile device, etc. Although depicted as being separate from the processor 706, it is to be appreciated that the carrier dropper 710, carrier requestor 712, inactivity timer 714, dormancy timer 716, demodulator 704, and/or modulator 714 can be part of the processor 706 or multiple processors (not shown).

Figure 8:
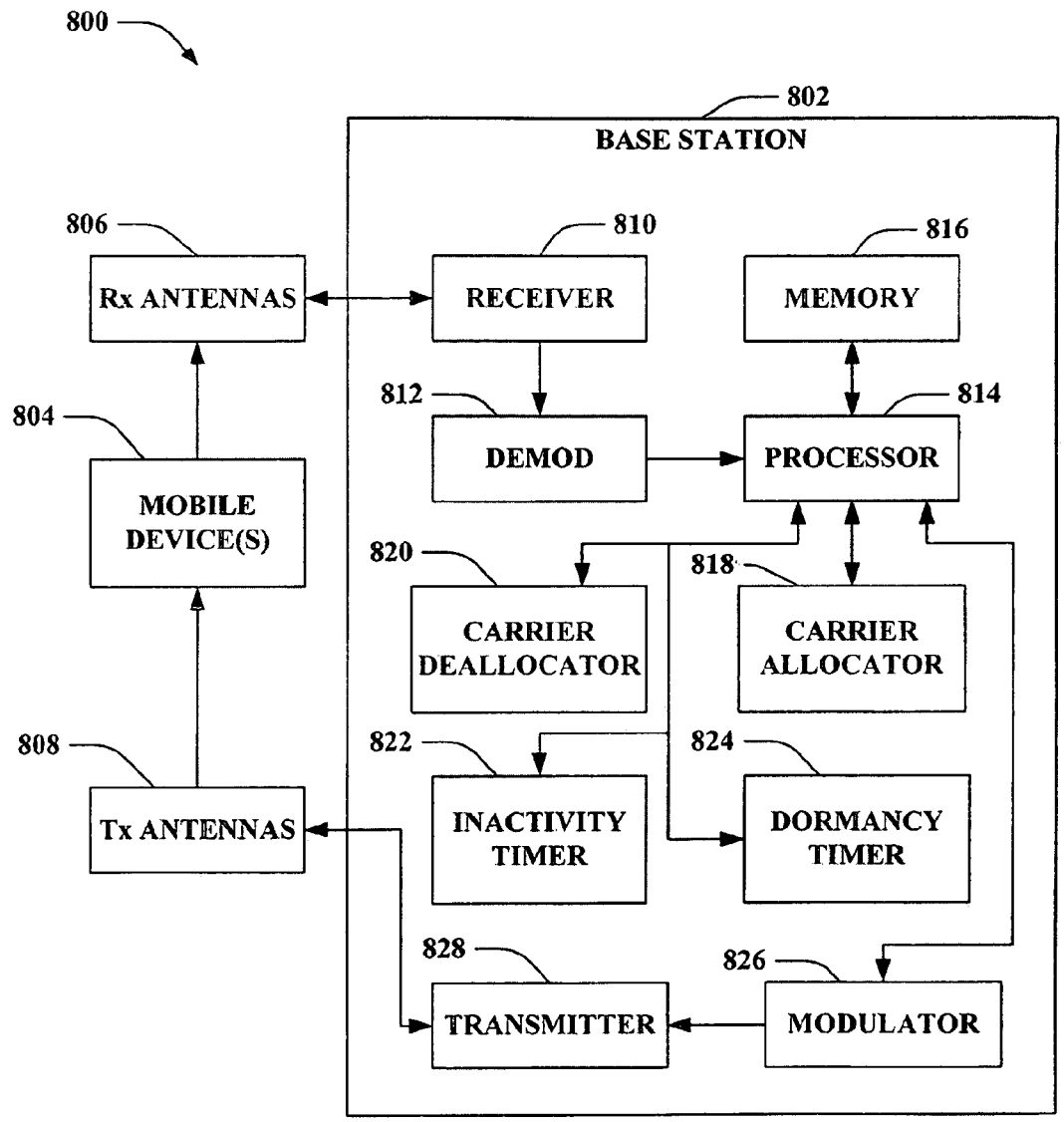
FIG. 8 is an illustration of an example system that facilitates adjusting carrier allocation based on communicative inactivity.

FIG. 8 is an illustration of a system 800 that facilitates allocating carriers to mobile devices based on inactivity in wireless communication networks. The system 800 comprises a base station 802 (e.g., access point, . . . ) with a receiver 810 that receives signal(s) from one or more mobile devices 804 through a plurality of receive antennas 806, and a transmitter 828 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a carrier allocator 818 that can allocate additional carriers to mobile device(s) 804 when needed, a carrier deallocator 820 that can deallocate one or more carriers from mobile device(s) 804, an inactivity timer 822 that can be utilized to detect a period of inactivity, and a dormancy timer 824 that can be utilized to detect a period of dormancy.

According to an example, the carrier allocator 818 can allocate a plurality of carriers to the mobile device(s) upon establishing a connection therewith. A period of communicative inactivity can be detected, as described, and the inactivity timer 822 and dormancy timer 824 can be started. The timers 822 and 824 are reset upon detecting communicative activity. However, if the inactivity timer 822 expires before communications again become active with the mobile device(s) 804, the carrier deallocator 820 can deallocate one or more carriers to bring the connection to a minimum level for receiving data requests thereover. If such requests are received before expiration of the dormancy timer 824, the carrier allocator 818 can reallocate one or more carriers to the mobile device(s) 804 to receive a response to the request. If the dormancy timer 824 subsequently expires, the base station 802 can terminate connection with the mobile device(s) 804. If the mobile device(s) 804 subsequently requests data from the base station 102, the connection will need to be reestablished to receive a response. Furthermore, although depicted as being separate from the processor 814, it is to be appreciated that the carrier allocator 818, carrier deallocator 820, inactivity timer 822, dormancy timer 824, demodulator 812, and/or modulator 826 can be part of the processor 814 or multiple processors (not shown).

Figure 9:
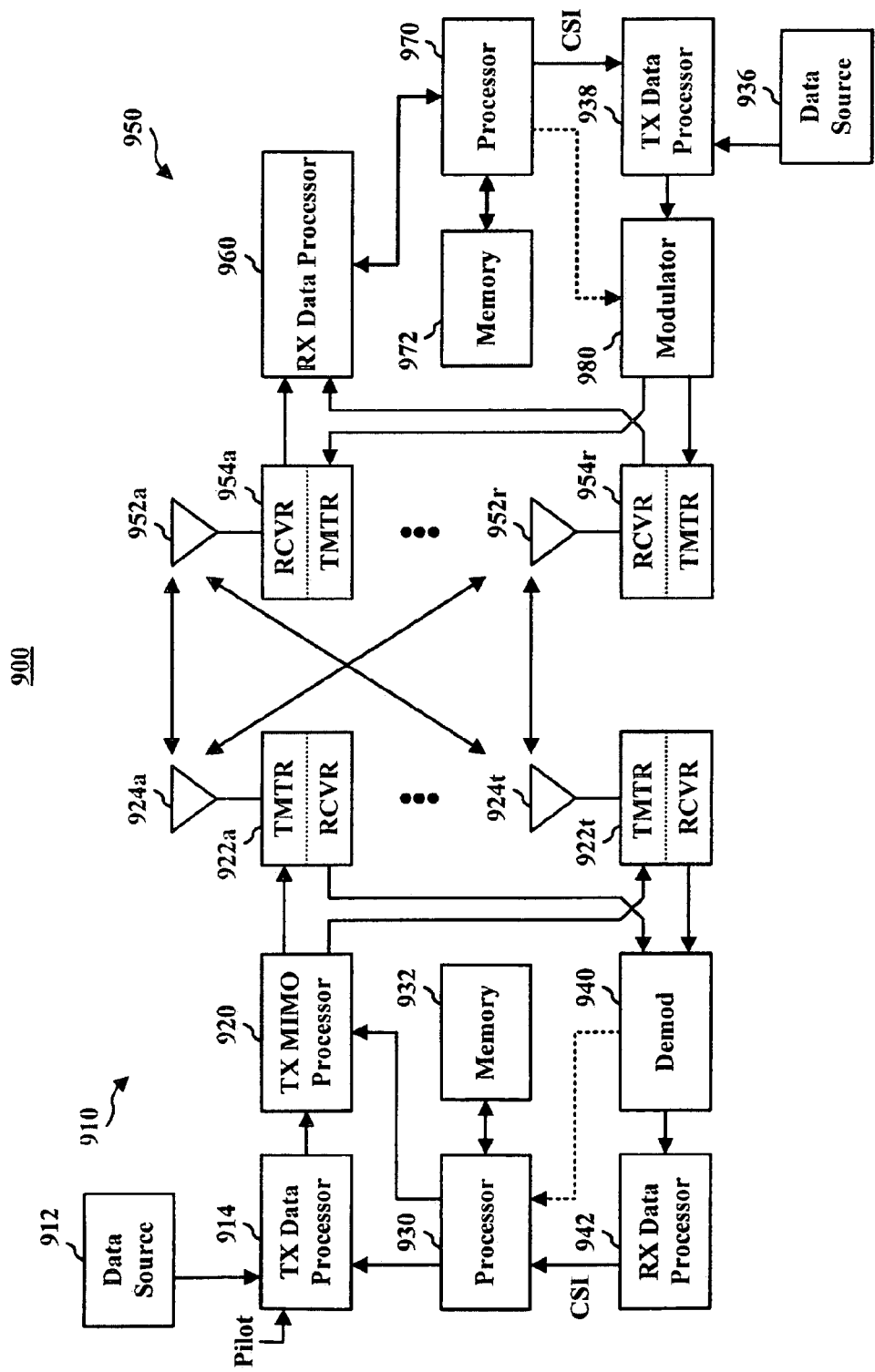
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
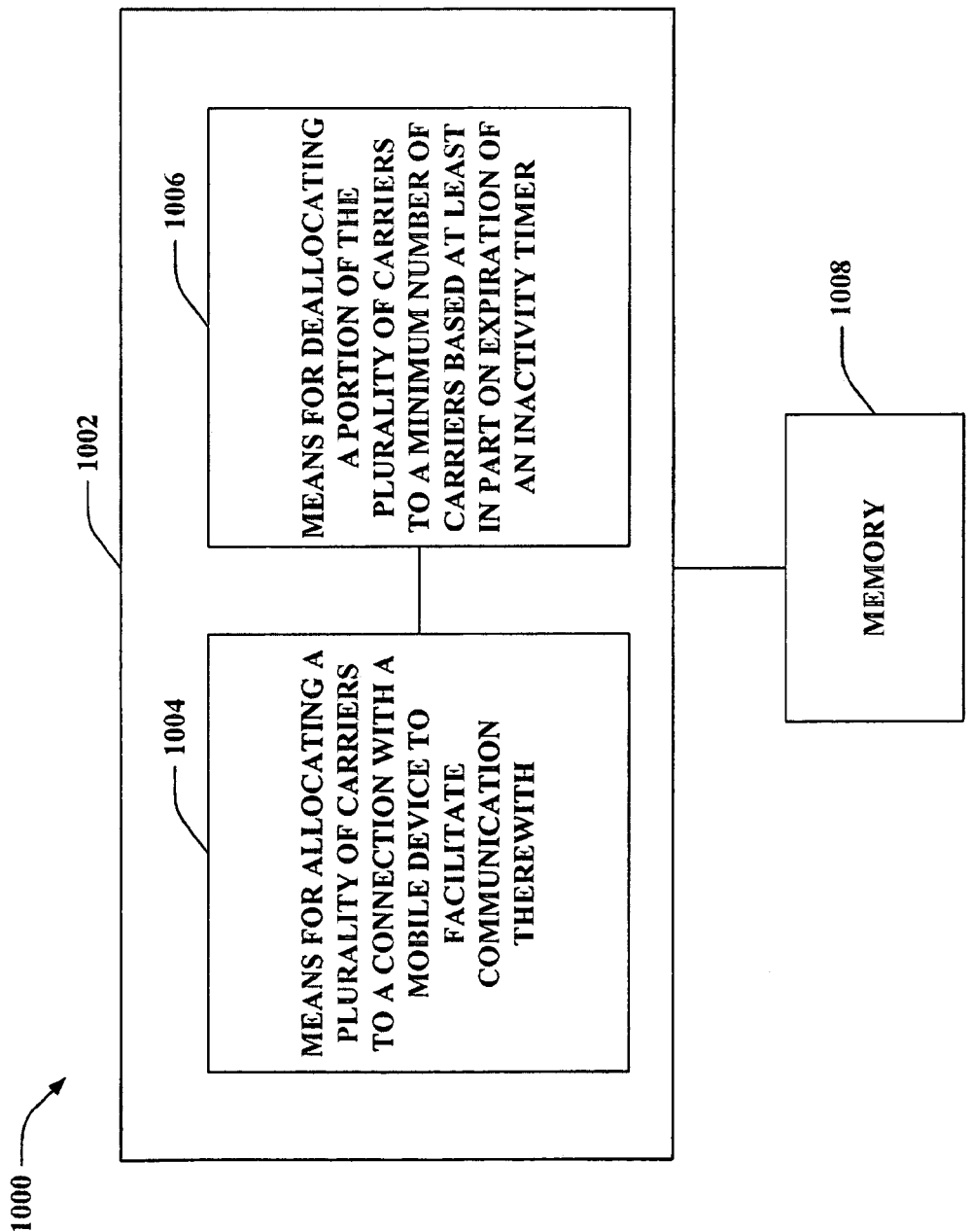
FIG. 10 is an illustration of an example system that allocates and deallocates carriers based on communicative inactivity.

With reference to FIG. 10, illustrated is a system 1000 that adjusts allocation of carriers according to periods of inactivity in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g. firmware). System 1000 includes a logical grouping 1002 of electrical components that can act in conjunction. For instance, logical grouping 1002 can include means for allocating a plurality of carriers to connection with a mobile device to facilitate communication therewith 1004. For example, the mobile device can transmit requests and receive responses over the plurality of carriers in a request/response configuration. Further, logical grouping 1002 can comprise means for deallocating a portion of the plurality of carriers to a minimum number of carriers based at least in part on expiration of an inactivity timer 1006. In one example, as described, the inactivity timer can be started upon detecting a period of communicative inactivity and reset upon receiving communication. However, where the inactivity timer expires before being reset, the carriers can be deallocated to preserve resources and reduce interference while leaving a carrier open to receive requests. As described, there can also be a dormancy timer for which expiration causes the connection with the mobile device to be terminated. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1008.

Figure 11:
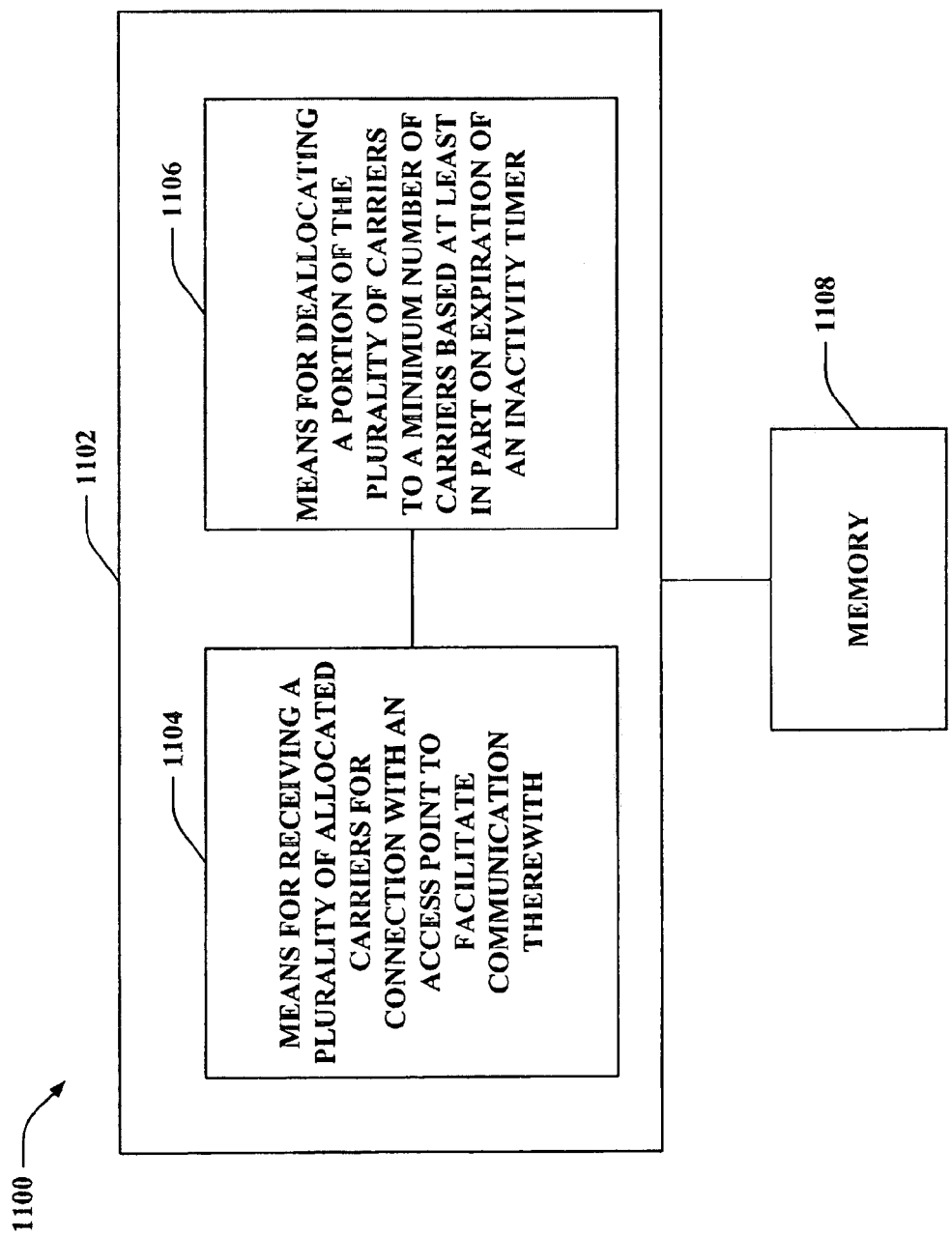
FIG. 11 is an illustration of an example system that drops carriers based on communicative inactivity.

Turning to FIG. 11, illustrated is a system 1100 that adds and drops carriers according to periods of inactivity in wireless communications. System 1100 can reside within a base station, mobile device, etc., for instance. As depicted, system 1100 includes functional blocks that can represent functions implemented by a processor, software, or combination thereof (e.g. firmware). System 1100 includes a logical grouping 1102 of means that facilitate adding and dropping carriers. Logical grouping 1102 can include means for receiving a plurality of allocated carriers for connection with an access point to facilitate communication therewith 1104. As described, the allocated carriers can be utilized to request data to and receive responses from the access point. Moreover, logical grouping 1102 can include means for deallocating a portion of the plurality of carriers to a minimum number of carriers based at least in part on expiration of an inactivity timer 1106. As described, utilizing an inactivity timer can facilitate conservation of resources and reduction of interference by allowing the carriers to be dropped when not needed while still keeping a minimum number so as not to completely terminate the connection. The connection can be terminated based on a separate dormancy timer, for example. Additionally, system 1100 can include a memory 1108 that retains instructions for executing functions associated with electrical components 1104 and 1106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for allocating multi-carrier resources in wireless communication networks, comprising:
    allocating multiple carriers to a connection with a mobile device facilitating communication therewith;
    setting a plurality of inactivity timers, wherein each inactivity timer is associated with a different carrier of the multiple carriers and each inactivity timer is set to a different time;
    reducing the connection with the mobile device to a single allocated carrier based at least in part on the plurality of inactivity timers;
    receiving a request for data over the single allocated carrier of the connection; and
    allocating one or more additional carriers to the connection before receiving a response to the request for data.

2. The method of claim 1, further comprising terminating the connection with the mobile device based at least in part on a dormancy timer.

3. The method of claim 2, wherein each inactivity timer is further set to a time less than the dormancy timer based at least in part on a type of the connection with the mobile device and a type of request used to communicate by the mobile device.

4. The method of claim 1, wherein the request for data is a hypertext transfer protocol (HTTP) or file transfer protocol (FTP) request.

5. The method of claim 1, further comprising transmitting the response to the mobile device over the connection.

6. The method of claim 1, the multiple carriers are allocated to the connection in an evolution data optimized (EV-DO) network.

7. A wireless communications apparatus, comprising:
    at least one processor configured to:
        allocate a plurality of carriers to a connection with a mobile device to facilitate communication therewith;
        set a plurality of inactivity timers, wherein each inactivity timer is associated with a different carrier of the plurality of carriers and each inactivity timer is set to a different time;
        determine expiration of the inactivity timers related to the connection;
        reduce the connection to a single allocated carrier based at least in part on expiration of the inactivity timers;
        receive a request for data over the single allocated carrier of the connection; and
        allocate one or more additional carriers to the connection before receiving a response to the request for data; and
    a memory coupled to the at least one processor.

8. A wireless communications apparatus that facilitates adjusting a number of carriers utilized in wireless communications, comprising:
    means for allocating a plurality of carriers to a connection with a mobile device to facilitate communication therewith;
    means for setting a plurality of inactivity timers, wherein each inactivity timer is associated with a different carrier of the plurality of carriers and each inactivity timer is set to a different time;
    means for deallocating a portion of the plurality of carriers to a minimum number of carriers based at least in part on expiration of the inactivity timers;
    means for receiving a request for data over a single allocated carrier of the connection; and
    means for allocating one or more additional carriers to the connection before receiving a response to the request for data.

9. A computer program product, comprising:
    a non-transitory computer-readable medium comprising:
    code for causing at least one computer to allocate multiple carriers to a connection with a mobile device facilitating communication therewith;
    code for causing the at least one computer to set a plurality of inactivity timers, wherein each inactivity timer is associated with a different carrier of the multiple carriers and each inactivity timer is set to a different time;
    code for causing the at least one computer to reduce the connection with the mobile device to a single allocated carrier based at least in part on the inactivity timers;
    code for causing the at least one computer to receive a request for data over the single allocated carrier of the connection; and
    code for causing the at least one computer to allocate one or more additional carriers to the connection before receiving a response to the request for data.

10. An apparatus, comprising:
    a carrier allocator that allocates a plurality of carriers for a connection established with a mobile device;
    a plurality of inactivity timers that are each set to a different time, wherein each inactivity timer is associated with a different carrier of the plurality of carriers;
    a transceiver that facilitates communicating with a mobile device over the plurality of allocated frequency carriers; and
    a carrier deallocator that deallocates one or more of the allocated frequency carriers from the connection based at least in part on expiration of the inactivity timers, wherein
    the transceiver receives a request for data over a single allocated carrier of the connection, and
    the carrier allocator allocates one or more additional carriers to the connection before a response receiver receives a response to the request for data.

11. The apparatus of claim 10, the carrier deallocator deallocates remaining assigned carriers to terminate the connection with the mobile device based at least in part on expiration of a dormancy timer.

12. The apparatus of claim 11, wherein each inactivity timer is further set to a time less than the dormancy timer based at least in part on a type of the connection with the mobile device and a type of request used to communicate by the mobile device.

13. The apparatus of claim 10, wherein the request for data is a hypertext transfer protocol (HTTP) or file transfer protocol (FTP) request.

14. The apparatus of claim 10, the transceiver transmits the response to the mobile device over the connection.

15. A method for allocating multi-carrier resources in wireless communication networks, comprising:
receiving multiple allocated carriers upon establishing a connection with an access point facilitating communication therewith;
dropping one or more of the multiple allocated carriers leaving a minimum number of carriers based at least in part on expiration of a plurality inactivity timers, wherein each inactivity timer is associated with a different carrier of the multiple allocated carriers and each inactivity timer is set to a different time;
transmitting a request for data over the minimum number of carriers of the connection; and
receiving an allocation of one or more additional carriers from the access point before receiving a response to the transmitted request.

16. The method of claim 15, further comprising terminating the connection with the access point based at least in part on expiration of a dormancy timer.

17. The method of claim 16, wherein each inactivity timer is further set to a time less than the dormancy timer based at least in part on a protocol utilized in the connection with the access point and a type of request used to communicate.

18. The method of claim 15, the request for data is a hypertext transfer protocol (HTTP) or file transfer protocol (FTP) request.

19. The method of claim 15, further comprising receiving the requested additional carriers from the access point.

20. The method of claim 19, further comprising receiving the response for the request over the additional carriers from the access point.

21. The method of claim 15, the carriers are allocated to the connection in an evolution data optimized (EV-DO) network.

22. A wireless communications apparatus, comprising:
at least one processor configured to:
receive a plurality of allocated carriers for connection with an access point to facilitate communication therewith;
determine expiration of a plurality of inactivity timers related to the connection;
drop one or more of the plurality of allocated carriers leaving a single allocated carrier based at least in part on expiration of the plurality of inactivity timers, wherein each inactivity timer is associated with a different carrier of the plurality of allocated carriers and each inactivity timer is set to a different time;
transmit a request for data over the single allocated carrier of the connection; and
receive an allocation of one or more additional carriers from the access point before receiving a response to the transmitted request; and
a memory coupled to the at least one processor.

23. A wireless communications apparatus that facilitates adjusting a number of carriers utilized in wireless communications, comprising:
means for receiving a plurality of allocated carriers for connection with an access point to facilitate communication therewith;
means for deallocating a portion of the plurality of carriers to a minimum number of carriers based at least in part on expiration of a plurality of inactivity timers, wherein each inactivity timer is associated with a different carrier of the plurality of allocated carriers and each inactivity timer is set to a different time;
means for transmitting a request for data over the minimum number of carriers of the connection; and
means for receiving allocation of one or more additional carriers from the access point before receiving a response to the transmitted request.

24. A computer program product, comprising:
a non-transitory computer-readable medium comprising:
code for causing at least one computer to receive multiple allocated carriers upon establishing a connection with an access point facilitating communication therewith;
code for causing the at least one computer to drop one or more of the multiple allocated carriers leaving a minimum number of carriers based at least in part on expiration of a plurality of inactivity timers, wherein each inactivity timer is associated with a different carrier of the multiple allocated carriers and each inactivity timer is set to a different time;
code for causing the at least one computer to transmit a request for data over the minimum number of carriers of the connection; and
code for causing the at least one computer to receive an allocation of one or more additional carriers from the access point before receiving a response to the transmitted request.

25. An apparatus, comprising:
a carrier requester that receives a plurality of requested carriers for connection to an access point;
an inactivity timer utilized to detect a period of communicative inactivity; and
a carrier dropper that drops one or more of the plurality of requested carriers leaving a minimum number of carriers for requesting data based at least in part on expiration of a plurality of inactivity timers, wherein each inactivity timer is associated with a different carrier of the plurality of requested carriers and each inactivity timer is set to a different time, and further wherein
the apparatus requests data over the minimum number of carriers, and
the carrier requestor receives one or more additional carriers to the connection from the access point before the apparatus receives a response to the request.

26. The apparatus of claim 25, the carrier dropper drops remaining assigned carriers to terminate the connection with the access point based at least in part on expiration of a dormancy timer.

27. The apparatus of claim 26, wherein each inactivity timer is further set to a time less than the dormancy timer based at least in part on a protocol utilized in communicating with the access point and a type of request used to communicate.

28. The apparatus of claim 25, wherein the request is transmitted as a hypertext transfer protocol (HTTP) or file transfer protocol (FTP) request.

29. The apparatus of claim 25, wherein the carrier requester receives the one or more additional carriers from the access point.

30. The apparatus of claim 29, the apparatus receives the response to the request over the one or more additional carriers.

* * * * *